Figure 2:
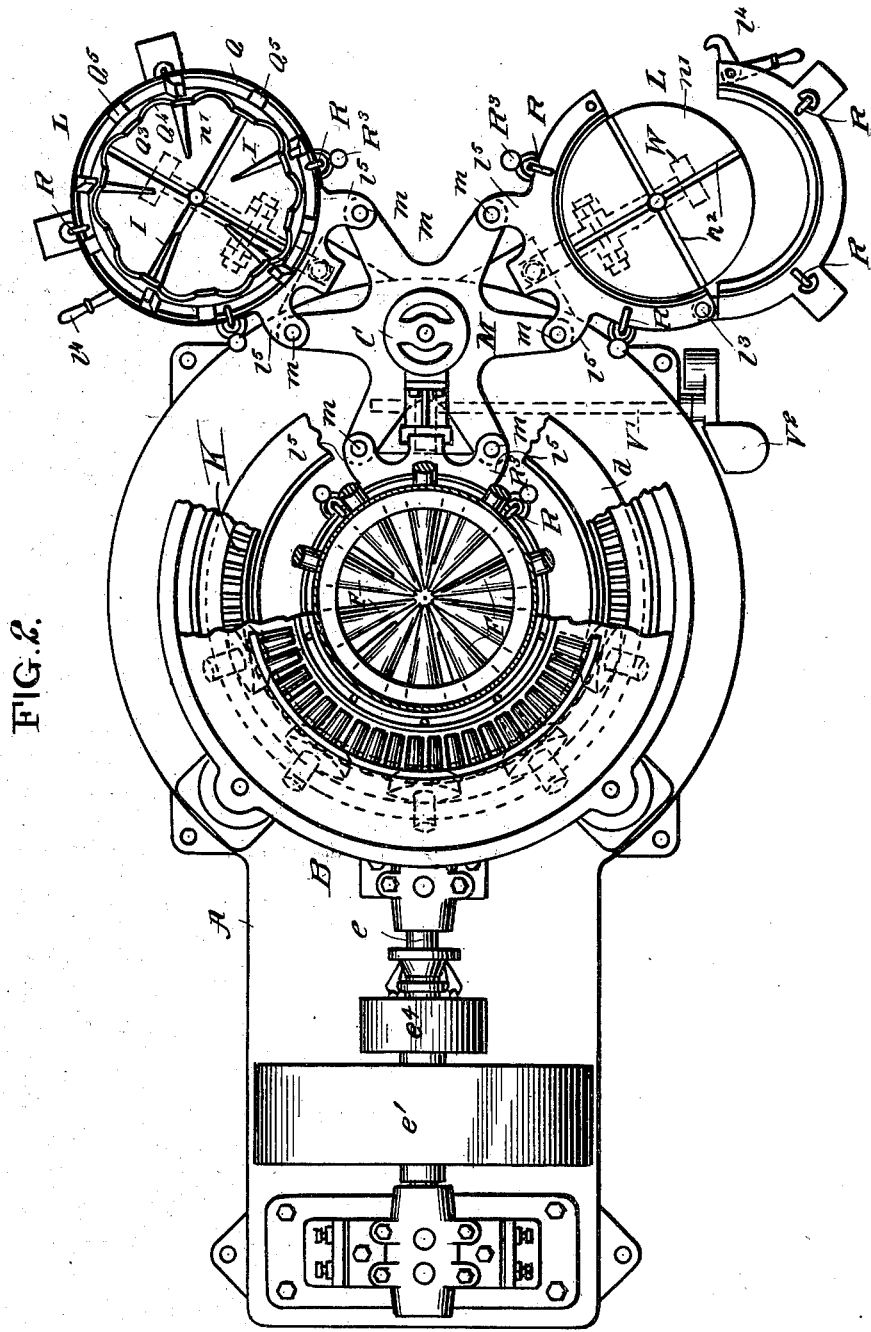

No. 734,695. PATENTED JULY 28, 1903.
J. T. FULLER.
COTTON PRESS.
APPLICATION FILED MAY 21, 1901.
NO MODEL. 4 SHEETS—SHEET 1.
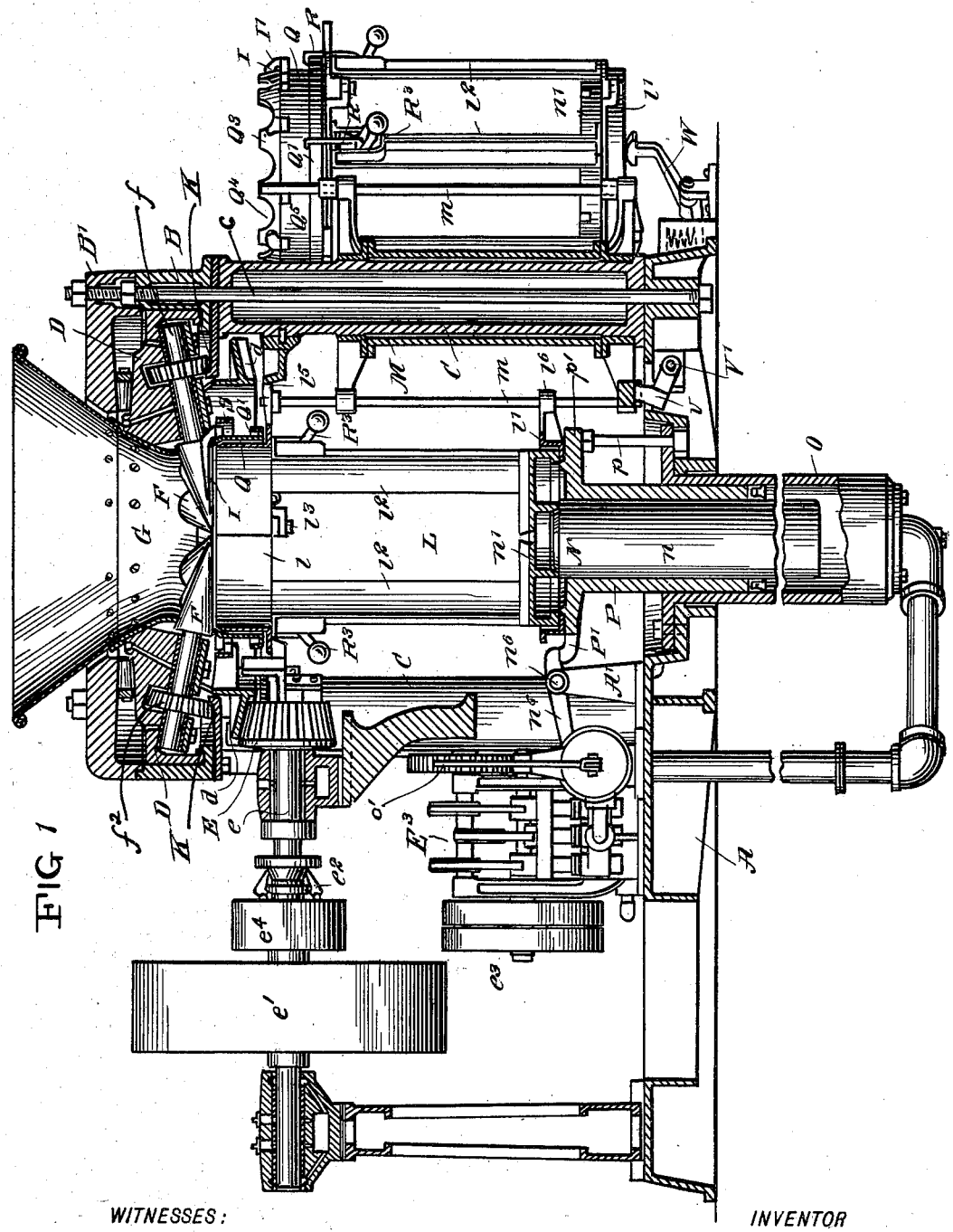
FIG. 1
WITNESSES:
INVENTOR
James T. Fuller
BY 
ATTORNEYS No. 734,695. PATENTED JULY 28, 1903.
J. T. FULLER.
COTTON PRESS.
APPLICATION FILED MAY 21, 1901.
NO MODEL. 4 SHEETS—SHEET 2.

WITNESSES: INVENTOR
James T. Fuller
BY
ATTORNEYS

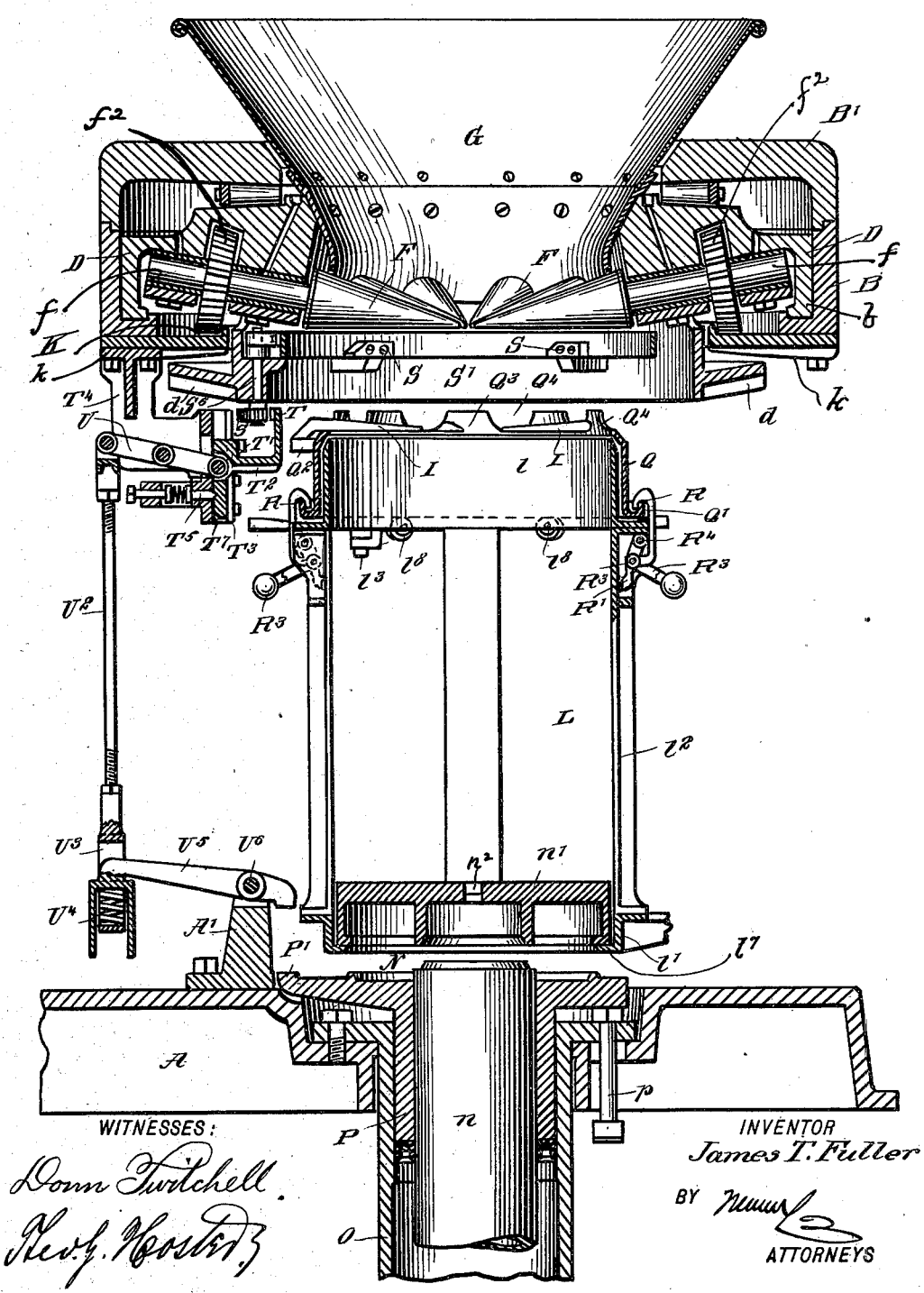

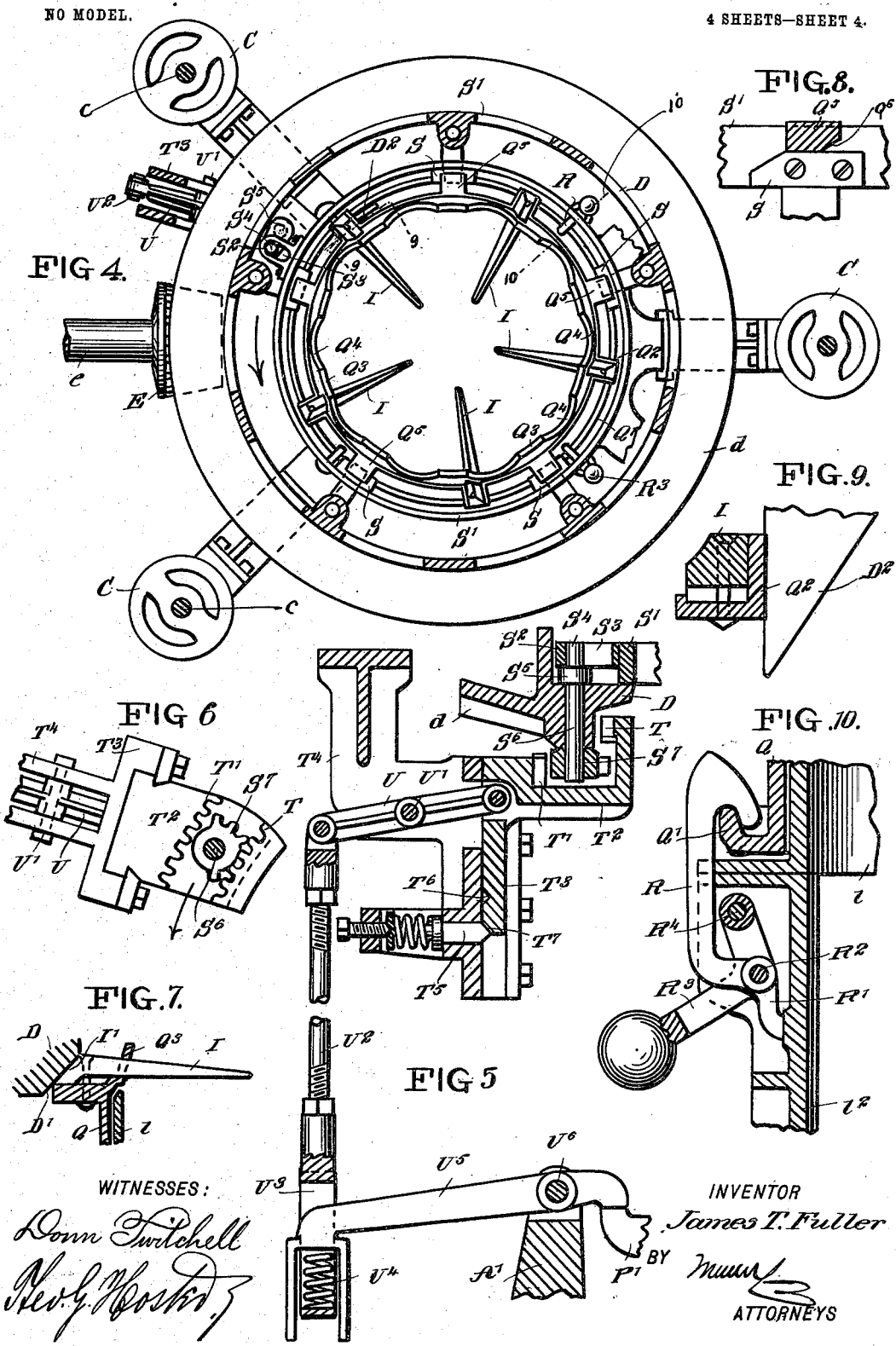

No. 734,695. Patented July 28, 1903.

UNITED STATES PATENT OFFICE.

JAMES T. FULLER, OF CALVERT, TEXAS, ASSIGNOR TO JULIUS F. WORKUM, OF ENGLEWOOD, NEW JERSEY.

COTTON-PRESS.

SPECIFICATION forming part of Letters Patent No. 734,695, dated July 28, 1903.

Application filed May 21, 1901. Serial No. 61,217. (No model.)

*To all whom it may concern:*

Be it known that I, JAMES T. FULLER, a citizen of the United States, and a resident of Calvert, in the county of Robertson and State of Texas, have invented certain new and useful Improvements in Baling-Presses, of which the following is a full, clear, and exact description, reference being had to the accompanying drawings, forming part of this specification.

The object of my invention is the production of a press which is particularly adapted for baling cotton and other materials in cylindrical bales in which the bales are built up endwise in continuous spiral layers arranged under heavy pressure; and, in general terms, the invention comprises a bale holder or support in or upon which the bales are formed, compressing mechanism coöperating therewith, means by which one of said parts is moved or actuated relatively to the other, and devices for retaining the formed bale under compression.

The various features constituting my invention are hereinafter described, and specifically pointed out in the claims.

In the drawings, Figure 1 is a sectional elevation of a press embodying my improvements. Fig. 2 is a plan view of the same with parts broken out. Fig. 3 is a sectional elevation, on a larger scale, showing a bale-holder lowered and free to swing from under the feeding and pressing device. Fig. 4 is a horizontal sectional view of a bale-holder. Fig. 5 is a sectional elevation of the devices for actuating the locking mechanism for the retainer. Fig. 6 is a plan view of the rack and pinion for actuating the locking mechanism. Fig. 7 is a sectional elevation of part of the carrier and retainer. Fig. 8 is a sectional elevation of part of the mechanism for locking the retainer to the carrier. Fig. 9 is a sectional elevation of part of the retainer and the actuating-arm of the carrier, and Fig. 10 is a sectional elevation of the clamping-hooks for the retainer.

Similar reference characters are employed to designate corresponding parts in all the views.

For the sake of clearness and brevity I have selected for the purpose of description and illustration a preferred form of press which I have constructed and successfully tested, and I wish it to be understood that my invention is not limited to the particular forms and details of construction herein illustrated, since many modifications may be made therein without departing from the spirit of my invention. This preferred form of press is mounted on a base A. A ring B and a head B' are supported above the base by the standards C and are held in place by bolts $c$, which extend upwardly from the base A through the standards C. The ring B is formed with an annular bearing or track $b$, upon which is supported a carrier D. In the form of press shown the compressing devices employed are a plurality of conical rollers, which are journaled in a carrier D, and the relative movement of the compressing devices and the bale-support is obtained by revolving or rotating the carrier D by means of a crown-gear $d$, secured to the under surface of the carrier D, and with which meshes a pinion E, carried by the driving or power shaft $e$, so that as the shaft $e$ is revolved the carrier D is also revolved on its bearings. The driving-pulley $e'$ is carried by the shaft $e$, and the rotation of the shaft is controlled by any suitable mechanism, such as a clutch $e^2$. A pump $E^3$ of any approved construction, provided with fast and loose pulleys $e^3$ and preferably mounted on the base A, is belted to the pulley $e^4$ on the driving-shaft $e$. This pump operates the hydraulic mechanism hereinafter more fully described. The rollers F, by which the cotton or other material is fed into the press from the feed-hopper G, are conical in shape and are arranged radially in an inclined position, so that their under or working surfaces lie in a horizontal plane over the bale-support. These feeding-rollers are journaled in and are entirely supported in the carrier D, which is provided with bearings for the shafts $f$ of the rollers. The rollers F extend closely toward a common center and are truncated, so that their apices shall be slightly blunt.

By supporting the rollers F entirely at their outer ends I avoid the necessity of a positive bearing at their common center, and consequently no lubrication is required at that point. By this construction, also, a clear and unobstructed space is secured above the rollers, and as the rollers may be constructed with imperforate ends—that is, without the axial opening which would be required if they were mounted on shafts extending through their points—none of the oil or other lubricants used on the outer bearings of the press can possibly reach the cotton or other material being operated upon.

For the purpose of positively rotating the feed-rollers F on their axes while they are traveling around their common center each roller carries on a shaft $f$, projecting therefrom, a pinion $f^2$, which meshes with a fixed circular rack K, carried on brackets $k$, secured to the standards C between the latter and the ring B. As the rollers are carried around by the revolving carrier the pinion $f^2$ will engage with the rack and turn the rollers axially. Below what I have called the "working" surfaces of the feed-rollers (and I employ this term to designate those portions of the rollers by which the feeding and pressing operations are performed) is a bale-holder L, consisting of the rings $l\ l'$, connected with each other by staves $l^2$. The rings $l\ l'$ are made in sections, connected by a hinge $l^3$ and a fastening device $l^4$, Fig. 2. The rings $l\ l'$ are provided with lugs $l^5\ l^5$, apertured to receive the pins $m$ on the yoke or crane M, which is rotatively carried by the standard C. As shown, three bale-holders L are supported by the yoke M, any one of which may be swung into position under the rollers, and the construction illustrated permits any holder to be raised or lowered on the pins $m$ to and from its operative position independently of the yoke or any of the other holders.

A bale-base $n'$ is arranged within the bale-holder L and supports the lower end of the bale during and after its formation. The bale-base rests upon a plunger $n$, which is preferably actuated by hydraulic pressure. When a plurality of bale-holders are employed, I prefer to construct the plunger and bale-base in separable parts, as shown, and to provide a bale-base for each holder, forming the lower ring $l'$ of each chamber with an inwardly-extending flange $l^7$, upon which the bale-base may rest, and thus form a bottom for the bale-holder, obviating the necessity of other devices at that point for retaining the cotton or other material in the holder after the bale is formed. This preferred construction is hereinafter referred to by me in describing the operation of the press. Two channels $n^2$, crossing each other at right angles, are usually formed on the upper surfaces of the bale-base $n'$, and the latter may be provided with a central aperture to permit the insertion of the bale-ties. The lower surface of the bale-base $n'$ is formed with a boss or projection which fits into a corresponding recess on the upper surface of the plunger, and when the bale-holder is opened to remove the bale the bale-base $n'$ is supported and held in place by the spring-arm W, Figs. 1 and 2. The plunger $n$ extends into the cylinder O and works through a piston P, upon which the lower ring $l'$ of the bale-holder seats when the piston rises. The piston P also extends into the cylinder O and is actuated by the pressure therein, which may be controlled in any suitable manner. A packing-ring $o$ prevents leakage around the plunger and the piston.

Referring to Fig. 1, when pressure is admitted to the cylinder O by any suitable governing device, such as a valve controlled by a hand-lever $o'$, the plunger and piston are carried up together until the bale-holder L is in operative position immediately under but not in contact with the surface of the rollers. At this point its movement is arrested by stops consisting of bolts $p$, which are secured in lugs $p'$ on the piston P and pass through apertures in the flange of the cylinder O and in the base A. The upward movement of the plunger, however, is not arrested, but continues until the upper surface of the bale-base $n'$ contacts with the working surfaces of the feed-rollers F.

For the purpose of preventing longitudinal expansion of the formed bale and confining it in the bale-holder, so that it may be swung from under the compressing mechanism and permanently tied without loss of density, I have devised entirely novel mechanism, which differs from anything heretofore employed for that purpose. This mechanism comprises as an essential feature a retainer, which is secured to the compressing mechanism during the formation of the bale, so as to have no movement relatively to the compressing mechanism while the bale is being formed and which is locked to the bale holder or support after the bale is formed, so as to confine the formed bale between the bale base or support and the retainer and hold it against longitudinal expansion during the tying operation, the bale-base forming an abutment for one end of the bale while the retainer is rigidly connected with the bale-base by means of the rings and staves of the bale-holder and the locking means to be presently described, which are thrown into engagement with the retainer and hold it firmly on the bale-holder when the bale is formed. Thus, in effect, the retainer is locked or clamped to the bale-base, the compressed bale being confined between them. The retainer consists of a frame Q, which carries arms or projections I, extending inwardly toward the center of the bale-holder or bale-base. The arms I are preferably formed separately from the frame Q and are securely bolted thereto, and their outer ends are beveled to fit corresponding recessed inclines D' on the carrier D, Fig. 7, so that when the retainer is lifted into position, as will be presently described, it will be guided by said inclines D' and will be firmly and accurately positioned on the under side of the carrier D. Preferably, as in the form of apparatus I have herein illustrated and described, the arms I when the carrier is thus positioned are so arranged that one of the arms I will be held closely adjacent to the under side of each of the rollers F, and the arms are extended inwardly well toward the apices of the rollers, so that they will act as strippers for the rollers and prevent the material being operated upon from adhering thereto. The frame Q fits loosely over the ring $l$ of the bale-holder and in its normal position—that is, when not coöperating with the compressing mechanism to form a bale—rests on antifriction-rollers $l^3$, which are preferably provided to support it. The frame Q is held loosely on the ring $l$ by hooks R, which project over a flange Q', formed on the frame. These hooks operate automatically to engage the flange Q' when the retainer is placed in position over the ring $l$, being pivoted to the weighted bell-crank levers $R^3$, fulcrumed at $R^4$ on the staves $l^2$ of the bale-holder. When the retainer is being placed in position, the flange Q' will engage the hooks R and swing them outwardly, permitting the retainer to descend until it rests on the rollers $l^8$, when the flange having passed the hooks the latter will swing in above the top of the flange. The hooks do not fit the flange Q' closely enough to prevent the relative rotation of the retainer and the bale-holder nor tightly enough to prevent a slight upward movement of the retainer on the bale-holder when the former is lifted from the rollers $l^3$ and locked to the compressing mechanism.

The upper edge of the frame Q' is formed with a flange $Q^3$, provided with the cut-out portions $Q^4$, which when the retainer is carried up by the bale-holder permit the intervening portions of the flange to fit close against the lower end of the hopper, so as to form a continuous flaring lower end for the hopper extending to the lower surfaces of the rollers.

A ring S' is fitted within the carrier D just below the rollers F and is carried by lugs projecting from the carrier. Lugs S are formed on said ring, and the edges thereof are beveled. The lugs S are so spaced that when the retainer is lifted with the bale-holder and the ring S' is slightly rotated the bevels on the lugs S will engage corresponding bevels on lugs $Q^5$, secured to the frame Q. The ring S' is provided with an arm $S^2$, in which is formed the slot $S^3$, Figs. 4 and 5. A stud $S^4$ on the arm $S^5$ engages with the slot $S^3$. The arm $S^5$ is carried by a shaft $S^6$, journaled in the carrier D, and to the lower end of the shaft is secured a mutilated pinion $S^7$, Fig. 6, which engages with one or the other of the racks T T', located in different horizontal planes depending upon the position of the racks which are carried by the block $T^2$, mounted to slide vertically in bearings $T^3$ on the bracket $T^4$, attached to the ring B. A lever U, pivotally supported at U' on the bracket $T^4$, is at one end pivotally connected with the block $T^2$, and at the opposite end is connected by the rod $U^2$ with the lever $U^5$, a spring $U^4$ being inclosed between a yoke $U^3$, formed on the lower end of the rod $U^2$ and the forked end of the lever $U^5$. The lever $U^5$ is pivoted to the base A, and its opposite end lies in the path of the lug P', formed on the piston P. A spring-pressed pin $T^5$ engages the lower end of the block $T^2$ when the latter is raised and engages a notch $T^6$ on said block when the block is lowered. The tension of the spring which actuates the pin $T^5$ is sufficient to cause the pin to hold the block $T^2$ steadily in its lower position and to cause said pin to oppose some resistance to the upward movement of the block, but it is not sufficient to cause the pin to resist the weight of the parts when the lever $U^5$ is not supported by the piston. Hence when the piston is moved upwardly to lift the bale-holder the lever $U^5$ will compress the spring $U^4$ without immediately shifting the block $T^3$; but as the movement of the lever continues and the pressure of the spring $U^4$ increases the resistance which the spring-pressed pin $T^5$ exerts to the movement will be overcome and the block $T^2$ will be instantly shifted to carry the rack T' into position to engage the pinion $S^7$, and when the piston is lowered the weight of the parts will carry the block $T^2$ downwardly to bring the rack T into position to engage said pinion.

The following is the operation of the press which I have now described: The press having been started to rotate the carrier D, one of the bale-holders, with the retainer Q resting on its upper end, is swung in under the compressing mechanism, and the catch V, Figs. 1 and 2, which is carried by the counterweighted shaft V', controlled by a treadle $V^2$, is operated to engage a notch on the under surface of the yoke M and lock the bale-holder in position. Pressure is then admitted to the cylinder O by operating the valve-lever o'. The bale-support N and the piston P are thereby forced upwardly and the piston P engages the bottom of the bale-holder L, which guided by the rod $m$ is carried up until its motion is arrested by the stops $p$. In its upward movement the lug P' on the piston P will engage the lever $U^5$, thereby lifting the block $T^2$ to carry the rack T' into position for engagement with the pinion $S^7$. The rotation of the carrier will cause the pinion $S^7$ to engage with the rack T', and the former, with its shaft $S^6$, will be turned to swing the crank-arm $S^5$ and impart a slight rotary movement to the ring S'. This will cause the bevels on the lugs S, which are secured to the rings S', to engage with the inclines on the lugs $Q^3$, carried by the frame Q, and the frame will be carried upwardly, so as to bring the upper edges of the flange $Q^3$ against the lower edge of the hopper G. The bevels on the ends of the finger I will engage with the corresponding recessed inclines D' on the carrier D intermediate the rollers, and the retainer will thus be locked securely to the compressing means, being positively carried therewith by the depending arm D² of the carrier, which engages a lug Q² on the retainer, as shown in Figs. 4 and 9. The plunger $n$ continues its upward movement after the retainer is thus secured to the compression means until the upper surface of the bale base or support engages the feed-rollers F. The cotton or other material is fed into the hopper to the rollers F and is by the latter deposited upon the upper surface of the bale-base in superimposed continuous spiral layers or laps. As the material is fed into the bale-holder by the rollers the bale-base $n'$ gradually recedes until it reaches the bottom of the holder and is arrested by the flange S⁷. The bale having thus been completely formed in a highly-compressed state in the bale-holder, the cylinder-pressure is thereupon reduced, permitting the piston P to descend. In this movement it is carried out of engagement with the lever U⁵, and the weight of the connected parts will cause the block T² to descend, bringing the rack T into position for engagement with the pinion S⁷. The engagement of the pinion S⁷ with the rack T will turn the ring S' to carry the lug S out of engagement with the lug Q³. This will unlock the retainer from the compressing mechanism and the retainer will be held to the bale-holder by the hooks R, the expansive force of the cotton or other material in the holder against the arms I causing the hooks to tightly clamp the flange Q'. The bale-holder, with the retainer clamped thereon, is then lowered until it reaches the position shown in Fig. 3, the plunger $n$ and piston P being lowered out of contact with the bale-base $n'$. The treadle V² is operated to release the catch V, and the crane M is then turned to swing the bale-holder, with the completed bale clamped therein, out of line with the compressing mechanism, the same movement carrying an empty bale-holder into position for the formation of another bale. The formed bale is then tied by suitable bale-ties, and thus permanently secured against expansion. The hooks R are released by lifting up the weighted ends of the bell-crank levers R³, the retainer is removed, the bale-holder is unlatched, the completed bale is removed, and the retainer is replaced in position. While this is being done, another bale is being formed, and the steps just described are repeated as each bale is completed, the operation of the press thus being continuous.

Having thus described my invention, what I claim as new, and desire to secure by Letters Patent, is—

1. In a bale-forming press the combination of compressing devices, a bale holder or support, means for imparting movement to one of said elements relatively to the other to effect the compression, a retainer having bale-engaging projections or arms, means for securing the retainer to the compressing devices during the formation of the bale and means for locking the retainer to the bale holder or support when the bale is formed and swung out of line with the compression devices.

2. In a bale-forming press the combination of compressing devices, a bale holder or support, means for rotating one of said elements relatively to the other, a retainer having bale-engaging projections, means for engaging the retainer with the compressing devices during the formation of the bale and means for locking the retainer to the bale holder or support when the bale is formed to permit the bale to be moved away from the compressing devices without longitudinal expansion.

3. In a bale-forming press of the character described the combination with the compressing devices, a bale-holder having a base movable in the holder, means for opposing a yielding resistance to the movement of the base, means for effecting a relative rotation of the compressing devices and the bale-holder, a retainer having bale-engaging projections, means for securing the retainer to the compressing devices during the formation of the bale and means for locking the retainer to the bale-holder when the bale is formed to permit the bale to be moved away from the compressing devices without longitudinal expansion, substantially as set forth.

4. In a bale-forming press the combination of compressing devices, a bale holder or support, means for rotating the compressing devices, a retainer having bale-engaging projections, means for engaging the retainer to rotate with the compressing devices during the formation of the bale and means for disengaging the retainer and compressing devices and locking the retainer to the bale holder or support when the bale is formed, substantially as set forth.

5. In a bale-forming press the combination of compressing devices comprising a plurality of conical rollers, a bale holder or support, means for effecting a relative rotation of the compressing devices and the bale holder or support, a retainer having bale-engaging arms, means for engaging the retainer with the compressing devices during the formation of the bale and means for disengaging the retainer from the compressing devices and locking it to the bale holder or support when the bale is formed, substantially as set forth.

6. In a bale-forming press the combination of compressing devices comprising a plurality of conical rollers, a bale holder or support, means for effecting a relative rotation of the compressing devices and the bale holder or support, a retainer having bale-engaging arms arranged to form stripping-fingers for the rollers, means for engaging the retainer with the compressing devices during the formation of the bale, and means for disengaging the retainer from the compressing devices and locking it to the bale holder or support when the bale is formed, substantially as set forth.

7. A bale-forming press having compressing devices, a bale-holder, means for effecting a relative rotation thereof, arms arranged to form retaining-fingers for the bale in the bale-holder, means for detachably locking said arms to the bale-holder, and means for securing the arms to the compressing devices when detached from the bale-holder.

8. A press having a carrier, feed and pressure rollers journaled therein, a bale-holder, arms arranged to form stripping-fingers for said rollers and to form retaining-fingers for the bale in the bale-holder, and means for securing said arms to the carrier, as set forth.

9. A press having a carrier, feed and pressure rollers journaled therein, a bale-holder, arms arranged to form stripping-fingers for said rollers and to form retaining-fingers for the bale in the bale-holder, means for detachably engaging said arms to the carrier and means for disengaging said arms from the carrier and locking them to the bale-holder, substantially as set forth.

10. A press having a carrier, feed and pressure rollers journaled therein, a bale-holder, arms arranged to form stripping-fingers for said feed and pressure rollers and to form retaining-fingers for the bale in the bale-holder, a retaining-ring by which said arms are supported and which is exteriorly mounted on the head of the bale-holder, means for removably locking said ring thereto and means for securing said ring to said carrier, as set forth.

11. A press having a revoluble carrier, feed and pressure rollers journaled therein, a bale-holder, a retainer having arms for holding the pressed material in the holder after the holder is filled, and means for locking said retainer to said carriage to revolve with the latter, said arms then extending between adjacent rollers to form stripping-fingers therefor, as set forth.

12. A press having a carrier, feed and pressure rollers journaled therein, a feed-hopper secured to said carrier and having projections which lie between the rollers, a retainer comprising a ring, arms extending therefrom and arranged to form retaining-fingers for the bale in the bale-holder and stripping-fingers for said rollers, and an annular flange on said ring adapted to form a continuation of the lower end of the hopper, as set forth.

13. A press having a carrier, feed and pressure rollers journaled therein, a hopper secured to said carrier and having projections which lie between the rollers, a bale-holder, a retainer comprising a ring and an annular flange extending from said ring to form a continuation of the lower end of said hopper and means for locking said retainer to said carrier, as set forth.

14. A press having a carrier, feed and pressure rollers journaled therein, a hopper secured to said carrier and having projections which lie between the rollers, a bale-holder, and a retainer having arms for holding the pressed material in the bale-holder after the holder is filled, means for locking the retainer to the carrier and a flange on said retainer for forming an extension of the hopper, the flange having cut-out portions to fit the peripheral face of the rollers, as set forth.

15. A bale-holder having retaining-arms, a retaining-ring carrying the arms and mounted to turn on the bale-holder, a flange on said ring, hooks which engage the flange and have an extension resting against the side of the bale-holder and a weighted lever fulcrumed on said bale-holder and on which said hook is pivoted, as set forth.

16. A press comprising a carrier with recessed inclines, a retainer having beveled faces for engaging said inclines to center the retainer relatively to the carrier at the time the retainer is lifted into position, as set forth.

17. A press having a carrier, feed and pressure rollers journaled therein, a bale-holder, a bale-base therein, pressure means for raising and lowering the bale-holder and bale-base, a retainer on said bale-holder having bale-engaging arms, means for engaging said retainer with said carrier and means controlled by said pressure means for actuating said engaging means, as set forth.

18. A press having a carrier, feed and pressure rollers journaled therein, a bale-holder, a bale-base therein, pressure means for raising and lowering the bale-holder and bale-base, a retainer on said bale-holder having bale-engaging arms, means for engaging said retainer with said carrier, means controlled by said pressure means for actuating said engaging means and means for centering said retainer on said carrier, as set forth.

In testimony whereof I have signed my name to this specification in the presence of two subscribing witnesses.

JAMES T. FULLER.

Witnesses:
 THEO. G. HOSTER,
 EVERARD BOLTON MARSHALL.